(12) United States Patent
Dupre, Jr.

(10) Patent No.: US 7,049,387 B2
(45) Date of Patent: May 23, 2006

(54) CURE ACCELERATOR SYSTEM FOR PHENOLIC RESINS

(75) Inventor: Frederick C. Dupre, Jr., Decatur, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 658 days.

(21) Appl. No.: 09/977,245

(22) Filed: Oct. 16, 2001

(65) Prior Publication Data

US 2003/0071393 A1    Apr. 17, 2003

(51) Int. Cl.
*C08G 8/04*    (2006.01)

(52) U.S. Cl. ............ 528/129; 528/146; 264/236; 525/480; 525/484

(58) Field of Classification Search ........ 528/129, 528/146; 264/236; 525/480, 484
See application file for complete search history.

(56) References Cited

U.S. PATENT DOCUMENTS

| | | |
|---|---|---|
| 3,740,358 A | 6/1973 | Byerley et al. |
| 3,784,514 A | 1/1974 | Tiedeman |
| 3,784,515 A | 1/1974 | Freeman et al. |
| 3,786,025 A | 1/1974 | Freeman et al. |
| 4,089,837 A | 5/1978 | Luttinger et al. |
| 4,105,604 A | 8/1978 | Vargiu et al. |
| 4,806,611 A | 2/1989 | Honel et al. |
| 4,859,788 A | 8/1989 | Brindopke et al. |
| 4,961,795 A | 10/1990 | Detlefsen et al. |
| 4,977,231 A | 12/1990 | McVay et al. |
| 5,294,649 A | 3/1994 | Gerber |
| 5,498,647 A | 3/1996 | Shiau et al. |
| 5,637,374 A | 6/1997 | Shiau et al. |
| 5,700,587 A | 12/1997 | Shiau et al. |
| 5,707,741 A | 1/1998 | Hoenel et al. |
| 5,935,710 A | 8/1999 | Hoenel et al. |
| 5,944,938 A | 8/1999 | Winterowd et al. |

FOREIGN PATENT DOCUMENTS

| | | |
|---|---|---|
| EP | 00661355 B1 | 3/1999 |
| GB | 1374332 | 11/1974 |

OTHER PUBLICATIONS

Eurpean Search Report dated Jan. 8, 2003
Revised Abstract by the Examing Divison, 02257159.0 Abstract/Zusammenfassung/Abrege.
Database WPI, Section Ch, Week 198526, Derwent Publications Ltd., London, GB; An 1985-157225, XP002226509 & JP 60 090251 A (Kyushu Refractories Co. Ltd), May 21, 1985.

*Primary Examiner*—Duc Truong
(74) *Attorney, Agent, or Firm*—Banner & Witcoff

(57) ABSTRACT

The cure rate of phenol-aldehyde resins is accelerated by conjoint use of a cyclic carbonate cure accelerant and an amine cure accelerant. The cure rate is accelerated still further by addition of a resorcinol source to resin comprising a cyclic carbonate and an amine cure accelerator. Also, cured resins made in accordance with the method.

11 Claims, No Drawings

CURE ACCELERATOR SYSTEM FOR PHENOLIC RESINS

FIELD OF THE INVENTION

The invention relates to a method for accelerating the cure rate of phenolic resins. In particular, the invention relates to the acceleration of the cure rate of phenol-aldehyde resins by conjoint use of cyclic carbonate and amine.

DESCRIPTION OF RELATED ART

Phenol-aldehyde resins are good adhesives for many components, including wood products. Such adhesive resins are used, for example, in the manufacture of plywood, particle board, oriented strand board (OSB), cardboard, wafer board products, and veneers. Phenol-aldehyde resins exhibit high strength and good chemical resistance. Therefore, such resins are good candidates for use in manufacture of wood products used in harsh environments.

However, phenol-aldehyde resins do not become activated, i.e., do not cure, at temperatures below about 130° F. (about 55° C.). Further, even at temperatures typically found during manufacture of such wood products, i.e., temperatures above about 200° F. (about 95° C.), phenol-aldehyde resins are slow to cure. Thus, a long period is required for the resin to set, even at elevated emperatures.

Preferred characteristics of a resin adhesive include low viscosity and a cure time that allows sufficient time for manipulation of the coated products. The time required for applying the resin adhesive and manipulation of the wood product depends upon the product being manufactured. This time for manipulation generally is referred to as the "assembly time" or the "pot life". Resin in this condition, i.e., before setting and curing, is known as A-stage resin.

After the assembly time, the viscosity of the adhesive should increase quickly, become set, and cure in a minimum period. Hardening agents, also known as cure accelerating agents, often are added to resin at some point during the curing to adjust the cure, or hardening, rate. A set resin is known as a B-stage resin, and a fully cured resin is known as a C-stage resin.

Known hardening agents include cyclic carbonates, such as ethylene carbonate and propylene carbonate, resorcinol and resorcinol-aldehyde resins, certain amines, such as primary aromatic amines, and isocyanate. Each of these accelerants poses a different difficulty, such as slowness of reaction or objectionable odors at commercially practical quantities and difficulty in controlling reaction rate. In particular, isocyanate poses safety issues and environmental problems. Therefore, there exists a need for a method for accelerating the cure rate of phenolic resins that provides quick curing upon application.

SUMMARY OF THE INVENTION

The invention is directed to a method for accelerating the cure rate of phenolic resins by conjoint use of cyclic carbonate and amine. The cure rate can be further accelerated by addition of a resorcinol source.

DETAILED DESCRIPTION OF THE INVENTION

The inventor has discovered a method for accelerating the cure rate of phenol aldehyde resins by conjoint use of cyclic carbonate and amine. Whereas both cycle carbonate and amine are known accelerants when used separately, the inventor has discovered that the cure rate of such resin is unexpectedly high when these accelerants are used in combination, as described herein. The inventor also has discovered that addition of a resorcinol source increases the cure rate even more.

Phenol-aldehyde resins often are made by condensation in an alkaline medium. As used herein, "alkaline" refers to the presence of alkali metal hydroxides or alkaline earth metal hydroxides in solution. Typically, the alkali metal is sodium, potassium, or lithium; typical alkaline earth metals are calcium and barium. Most typically, the alkali metal is sodium. However, the composition of the alkaline medium is not critical herein. Mixtures of such media also can be used.

As the aqueous solvent for the alkaline medium and for the resin, water is most suitable. Mixed solvents that comprise water and water-soluble lower alcohols, or other water-soluble organic solvents that are not detrimental to the phenol-aldehyde condensation reaction, also are suitable. These aqueous solvents typically are present in quantity to yield a resin having a solid content of between about 40% and about 80%, preferably between about 55 and about 70%, and more preferably between about 60% and about 70% solids by weight.

This phenol component of a phenol-aldehyde resin most typically is phenol itself, but also may be selected from cresol and other substituted phenols. Skilled practitioners recognize that alkyl-, aryl-, alkenyl-, alkoxy-, aryloxy-, and halogen-substituted phenols also can be used. Also, the bisphenols are suitable phenol constituents. Typically, phenol and the cresols are used. Further, skilled practitioners recognize that mixtures of phenols often are suitably used. For brevity, the invention will be described as it relates to phenol. However, it should be understood that the invention relates to more than the composition phenol itself.

The aldehyde component typically is one of the solid or liquid forms of formaldehyde, such as formaldehyde, whether alone or in aqueous solution, solid paraformaldehyde, formalin solution, and the like. Skilled practitioners recognize that formalin is an aqueous solution of formaldehyde comprising about 37% by weight of formaldehyde and a low concentration of methanol, and that the presence of this concentration of methanol is not detrimental to the phenol-aldehyde condensation reaction, or to the product formed. For brevity, the invention will be described as it relates to formaldehyde in any form.

Skilled practitioners are familiar with methods for forming such resins by combining phenol and aldehyde, alkaline medium, and, if appropriate, water, in quantities appropriate for forming resin having the desired phenol-aldehyde ratio. Typically, these ingredients are combined and the temperature is increased to a temperature sufficient to initiate the condensation reaction. The condensation reaction is allowed to proceed until the desired degree of condensation has been achieved. Typically, then, the solids concentration is adjusted, if desired, and the temperature is reduced to ambient. The resultant resin is an A-stage resin.

Any phenol-formaldehyde resin containing an excess of formaldehyde is suitable for use in the method of the invention. Thus, phenol-formaldehyde resins suitable for use in the method of the invention are resole resins, i.e., resins in which the molar ratio of formaldehyde to phenol is greater than 1. The method of the invention also can be used with a novolac resin that also contains a formaldehyde donor, such as hexamethylene tetraamine. Skilled practitioners recognize that hexamethylene tetraamine is easily hydrolyzed by the presence of water and free phenol. Formaldehyde is produced in accordance with the reversible reaction $6CH_2O + 4NH_3 = (CH_2)_6N_4 + 6H_2O$.

Phenol-formaldehyde resins suitable for use in the method of the invention are A-stage resins that are soluble in water or in any of the solvents typically used for such resins, such as methanol. Thus, suitable resins need not be infinitely dilutable with water.

In accordance with the method of the invention, cyclic carbonate and amine are added in combination to an A-stage phenolic resin to accelerate the rate of cure. Addition of a resorcinol source further accelerates the cure rate.

Accelerants are added at any time after the A-stage resin is formed. Skilled practitioners recognize that an A-stage resin will continue to advance after the A-stage resin cook, even after the resin has been cooled to ambient temperature. Skilled practitioners further recognize that cure accelerators typically have little effect on the curing of a resin at ambient temperature, as the curing reaction occurs only slowly at temperatures below about 105° F. (about 40° C.). The useful life at ambient temperature of a resin containing cure accelerants is about one day after addition of accelerants. The accelerants may cause the resin or solution thereof to gel, thus reducing the ease of handling of the resin. Therefore, it is preferred to add the accelerants at the time of use, i.e., shortly before the resin temperature is raised to cure the resin.

In accordance with the method of the invention, cyclic carbonate and amine cure accelerants are added conjointly to a phenol-formaldehyde resin. Typically, one accelerant first is thoroughly blended into the resin; then, the other accelerant is thoroughly blended into the resin. The order of addition is not critical. Indeed, both accelerants may be added simultaneously.

Cyclic carbonate accelerants are known in the art. Examples of suitable cyclic carbonates include the alkylene carbonates, including in particular ethylene carbonate and propylene carbonate; ethylene glycol carbonate; glycerol carbonate; glycidol carbonate; 1,2-butanediol carbonate; 1,3-butanediol carbonate; 1,2-pentanediol carbonate; and 1,3-pentanediol carbonate. Epoxy carbonates also are suitable. Propylene carbonate and ethylene carbonate are preferred. Blends of these accelerants also can be used.

Amine cure accelerators are selected from primary, secondary, and tertiary amines. Aromatic amines also may be suitable. Polyalkylene polyamines and polyalkylene glycol polyamines are preferred. Preferred polyalkylene polyamines include triethylene triamine, triethylene tetramine, tetraethylene tetramine, and tetraethylene pentamine. Preferred polyalkylene glycol polyamines include polyethylene glycol diamines; triethylene glycol diamine and tetraethylene glycol diamine are more preferred polyalkylene glycol polyamines. Triethylene glycol diamine and tetraethylene glycol diamine are commercially available from Huntsmann Chemical under the tradenames EDR-148 and EDR-192, respectively.

Amine cure accelerant is used in an amount of at least about 0.1 weight %, typically between about 0.1 to about 10 weight %, preferably between about 0.5 and about 3.5 weight %, and more preferably between about 0.5 and about 2 weight %, based on the weight of the resin. Cyclic carbonate cure accelerant is used in an amount of 0.1 weight %, typically between about 0.1 to about 20 weight %, preferably between about 0.5 and about 10 weight %, and more preferably between about 0.5 and about 2 weight %, based on the weight of the resin. Lesser and greater quantities of accelerants may be used. However, lesser quantities may not provide sufficient accelerating effect. Greater quantities not only will shorten the "pot life," but also may not be economically efficient, as set forth below.

The relative quantities of amine accelerant and cyclic carbonate accelerant are independent, and are selected so as to provide a desired "pot life." The pot life is the length of the period between accelerant addition to an A-stage resin and cure completion to yield a C-stage resin. The greater the quantity of accelerants added, the shorter the pot life. For a given resin, shorter pot life is the result of a higher degree of acceleration. Typically, the quantity of cyclic carbonate accelerant is at least about equal to the quantity of amine accelerant, and preferably is between about 1 and about 4 times the quantity of amine accelerant.

Skilled practitioners recognize that ethylene carbonate is a solid and that propylene carbonate and the amines are liquids. Thus, ethylene carbonate typically is put into a liquid form, i.e., a solution in any suitable solvent, such as methanol. A suitable solvent would be one that does not degrade or deleteriously affect the resin product Ethylene carbonate also can be dissolved in solvated resin, but the dissolution likely would require heating of the resin. Although the amines typically are fluid, a solution thereof also may be formed. Any solvent is suitable, provided that the solvent does not interfere with the intended use of the resin. Methanol is a particularly suitable solvent for the amines and for ethylene carbonate.

The inventor also has discovered that addition of a resorcinol source to a resin to which both amine and cyclic carbonate cure accelerators have been added has a still-further cure-rate enhancing effect. Thus, the cure rate is further accelerated by addition of a resorcinol source to a resin comprising both amine and cyclic carbonate accelerators.

Resorcinol-aldehyde resins are suitable sources of resorcinol in accordance with the method of the invention; resorcinol-formaldehyde resin preferably is used. Any resorcinol-formaldehyde resin is suitable. Formaldehyde-starved novolac resorcinol-formaldehyde resins are preferred. Such preferred resins have excess free resorcinol, i.e., a concentration of free resorcinol that exceeds the concentration of free formaldehyde, and thus contribute free resorcinol to the reaction of the A-stage resin. Suitable resorcinol resins include G-P® 4221, a resorcinol/formaldehyde resin having excess free resorcinol, available from Georgia-Pacific Resins, Inc.

Not only do such resorcinol-formaldehyde novolac resins perform better than resorcinol alone, but also they are liquids, and thus are easy to handle and use. Other characteristics of such resins, such as viscosity, percent nonvolatiles, and the identity of catalyst or additives, if any, used to form the resin, are not critical to the practice of this invention, so long as they do not interfere with formation of the phenol-formaldehyde resin. Resorcinol itself also can be used.

The quantity of resorcinol, whether alone or in a resin, is between about 0.1 and about 30 weight %, based on the weight of the phenol-formaldehyde resin, preferably between about 0.5 and about 20 weight %, and more preferably between about 2 and about 5 weight %, based on the weight of the A-stage phenolic resin.

The cure rate of phenol-formaldehyde resin to which the cure rate accelerant combination of the invention has been added is significantly higher than the cure rate of resin to which only one or the other of the two cure rate accelerants has been added. The conjoint use of the two classes of accelerants in combination provides greater acceleration than would be expected, based on the rates of the individual accelerants. Further addition of a resorcinol source increases the cure rate even more.

One method known to skilled practitioners for determining the cure rate of phenol-formaldehyde resin is the stroke cure test. Skilled practitioners recognize that the stroke cure test does not yield a cure time under actual use, and is somewhat subjective in both the manner in which the test is run and the determination of cure completion. Further, where, as here, two or more cure accelerants are being added, the need to thoroughly mix the accelerants into the resin is especially important. However, the test is useful in establishing trends and relative performance when run in a consistent manner.

Skilled practitioners recognize that increasing the quantities of a cure accelerant may not produce concomitant or proportionate increase in cure rate because of many factors. These factors include, but are not limited to, competition for active polymerization sites in the A-stage resin, degree of advancement of the A-stage resin (a reflection of the number of available polymerization sites), and interaction between the accelerants. Indeed, the factors related to the characteristics of the phenolic resin also are found with use of only one accelerant. For example, a skilled practitioner recognizes that a reduction in cure time for addition of a quantity of an accelerant typically is not doubled by addition of twice the quantity. Rather, the expected effect typically would be less than double, because competition for active polymerization sites typically precludes realization of the entirety of the effect. Similarly, percentage reductions in cure time obtained by addition of a quantity of cure accelerant are likely to be lower for a more advanced A-stage resin that by addition of that quantity to a less-advanced resin because there exist fewer active polymerization sites.

When both amine and cyclic carbonate cure accelerants are added to the A-stage resin, greater cure acceleration is obtained than would be expected from combination of the individual contributions of the accelerants added. However, the effects of competition for active sites limit the improvement obtained as the total quantity of accelerants used increases.

Addition of a resorcinol-containing resin also changes the characteristics of the phenolic resin to which it was added by introduction of a second (resorcinol/formaldehyde, typically) resin type. However, the cure rate of the phenolic resin containing both amine and cyclic carbonate cure accelerants is further accelerated by addition of a resin containing excess resorcinol.

The unexpected advantages of the method of the invention and the effects of the mitigating factors are illustrated in the following example.

EXAMPLE

A phenol-formaldehyde resin was prepared in accordance with known techniques and in accordance with the method of the invention. After distillation to remove water from the resin, methanol was added and the pH was adjusted to near neutral.

The resultant resin had the following relevant characteristics and properties: a non-volatile concentration of about 66%, and F/P mole ratio of about 1.5, and a hot plate stroke cure time of about 60 seconds at 150° C.

The phenol formaldehyde resin was divided into portions having the same mass. Various amine and cyclic carbonate accelerators were added to the aliquots of the resin, as set forth below. Ethylene carbonate accelerant was added in methanol solution; propylene carbonate and the amine accelerants were liquid. Samples utilizing only one cure accelerant also were evaluated to provide a basis for comparison with tests of the method of the invention. The tests were carried out over a period of a few days, so the A-stage resin tested likely advanced some degree over the test period.

The cure time, in seconds, of each aliquot was determined by a hot plate stroke cure test run at 150° C., in accordance with standard procedures known to skilled practitioners. The percentage reduction in stroke cure time was calculated, as compared with the cure time of resin without accelerant, and is reported in the table below.

Each percentage reduction in cure time reported below is the average of plural (typically 3) test events.

| Test No. | Amine | Amine, wt. % | Propylene carbonate, wt. % | Ethylene carbonate, wt. % | Resorcinol from G-P ® 4221, wt. % | Resorcinol from a Resorcinol-containing resin, wt. % | Stroke Cure Reduction, wt. % |
|---|---|---|---|---|---|---|---|
| 1 | None | | 2.0 | | | | 0.9 |
| 2 | None | | | 2.0 | | | 4.8 |
| 3 | None | | | | 2.0 | | 20.7 |
| 4 | None | | | | 5.0 | | 29.7 |
| 5 | None | | | | | 2.0 | 7.6 |
| 6 | None | | | | | 5.0 | 14.8 |
| 7 | TEP | 0.5 | | | | | 20.7 |
| 8 | TEP | 0.5 | 2.0 | | | | 28.0 |
| 9 | TEP | 0.5 | | 2.0 | | | 36.0 |
| 10 | TEP | 0.5 | | 2.0 | 2.0 | | 41.2 |
| 11 | TEP | 2.0 | | | | | 17.2 |
| 12 | TEP | 2.0 | | 2.0 | | | 31.2 |
| 13 | TEP | 2.0 | 2.0 | | | 2.0 | 31.5 |
| 14 | TEP | 2.0 | 2.0 | | | 5.0 | 36.0 |
| 15 | TEP | 2.0 | | 2.0 | | 2.0 | 33.0 |
| 16 | TEP | 2.0 | | 2.0 | | 5.0 | 36.0 |
| 17 | TEP | 2.0 | | 2.0 | 2.0 | | 35.4 |
| 18 | TEP | 2.0 | | 2.0 | 5.0 | | 37.5 |
| 19 | TETA | 0.5 | | | | | 15.3 |
| 20 | TETA | 0.5 | | 2.0 | | | 20.0 |
| 21 | TETA | 0.5 | 2.0 | | 2.0 | | 22.0 |
| 22 | TETA | 0.5 | | 2.0 | 2.0 | | 26.0 |

-continued

| Test No. | Amine | Amine, wt. % | Propylene carbonate, wt. % | Ethylene carbonate, wt. % | Resorcinol from G-P ® 4221, wt. % | Resorcinol from a Resorcinol-containing resin, wt. % | Stroke Cure Reduction, wt. % |
|---|---|---|---|---|---|---|---|
| 23 | TETA | 2.0 | | | | | 24.3 |
| 24 | TETA | 2.0 | | 2.0 | 2.0 | | 29.2 |
| 25 | TETA | 2.0 | 2.0 | | 2.0 | | 27.3 |
| 26 | TETA | 2.0 | 2.0 | | 5.0 | | 30.6 |

TEP = tetraethylene pentamine;
TETA = triethylene tetramine

The synergistic effect obtained by practice of the invention and the other effects described above are illustrated by the data in the table above. For example, tests 8–10 and 12–16 clearly illustrate the synergistic effect of the method of the invention by comparison with the single-accelerant tests. Tests 17–18, 21–22, and 24–26 illustrate the effect of the invention, mitigated by some or all of the factors discussed above. The single accelerant tests also illustrate the mitigating factors, specifically the disproportionate effect of increasing the same type of accelerant (compare test 23 with test 19).

Comparison of tests 7 and 11 illustrate the subjective nature of the stroke cure test. Test 11, at a higher tetraethylene pentamine concentration than test 7, would be expected to yield a greater stroke cure reduction percentage. However, the data for tests 7–10 and 11–16 clearly show the effect of the method of the invention.

Tests 17–18, 21–22, and 24–26 illustrate the result of having a high total effectiveness level of accelerants, as they show the reduced total effect obtained when adding the highly effective resorcinol-containing resin. These tests also illustrate that the percentage stroke cure reduction for each of these examples increased with total increasing accelerant level.

Comparison of tests 15 and 16 shows the effect of the method of the invention together with the reduced effect of the higher level of resorcinol-containing resin.

The tests in this Example are intended to illustrate the invention, not to limit it. For example, each of the cure accelerants mentioned in the specification are suitably used in the practice of the invention. Also, phenol each of the types described in the specification, and blends thereof, are suitably used in the practice of the invention. The invention is limited only by the claims set forth below.

I claim:

1. A curable resin composition for binding wood and wood fiber products, said composition comprising:
    a curable phenol-aldehyde resin selected from the group consisting of resole resins and novolac resins comprising a source of free aldehyde;
    an effective amount of cyclic carbonate cure accelerant; and
    an effective amount of amine cure accelerant selected from the group consisting of polyalkylene polyamines, polyalkylene glycol polyamines, and blends thereof.

2. The composition of claim 1 wherein the cyclic carbonate cure accelerant is selected from the group consisting of alkylene carbonate, ethylene glycol carbonate; glycerol carbonate; glycidol carbonate; 1,2-butanediol carbonate; 1,3-butanediol carbonate; 1,2-pentanediol carbonate; 1,3-pentanediol carbonate; epoxy carbonates; and blends thereof, and is present in an amount between about 0.1 and about 20 weight %, based on the weight of the resin.

3. The resin composition of claim 1 wherein the polyalkylene polyamine amine cure accelerant is selected from the group consisting of triethylene triamine, triethylene tetramine, tetraethylene tetramine, tetraethylene pentamine, and blends thereof, the polyalkylene glycol polyamine amine cure accelerant is selected from the group consisting of polyethyleneglycol diamines, and blends thereof, and is present in an amount between 0.1 and about 10 weight %, based on the weight of the resin.

4. The resin composition of claim 2 wherein the polyalkylene polyamine amine cure accelerant is selected from the group consisting of triethylene triamine, triethylene tetramine, tetraethylene tetramine, tetraethylene pentamine, and blends thereof, the polyalkylene glycol polyamine amine cure accelerant is selected from the group consisting of polyethyleneglycol diamines, and blends thereof, and is present in an amount between 0.1 and about 10 weight %, based on the weight of the resin.

5. The resin composition of claim 4 further comprising an effective amount of resorcinol source.

6. The resin composition of claim 5 wherein the resorcinol source is a formaldehyde-starved novolac resorcinol-formaldehyde resin and is present in an amount sufficient to provide resorcinol in an amount between about 0.1 and about 30 weight %, based on the weight of the resin.

7. A cured phenol-aldehyde resin for binding wood and wood fiber products, said resin selected from the group consisting of resole resins and novolac resins comprising a source of free aldehyde, wherein said resin is cured in the presence of effective amounts of cyclic carbonate cure accelerant and amine cure accelerant selected from the group consisting of polyalkylene polyamines, polyalkylene glycol polyamines, and blends thereof.

8. The resin of claim 7 wherein the cyclic carbonate cure accelerant is selected from the group consisting of alkylene carbonate, ethylene glycol carbonate; glycerol carbonate; glycidol carbonate; 1,2-butanediol carbonate; 1,3-butanediol carbonate; 1,2-pentanediol carbonate; 1,3-pentanediol carbonate; epoxy carbonates; and blends thereof, and is present in an amount between about 0.1 and about 20 weight %, based on the weight of the resin.

9. The resin of claim 7 wherein the polyalkylene polyamine amine cure accelerant is selected from the group consisting of triethylene triamine, triethylene tetramine, tetraethylene tetramine, tetraethylene pentamine, and blends thereof, the polyalkylene glycol polyamine amine cure accelerant is selected from the group consisting of polyethyleneglycol diamines, and blends thereof, and is present in an amount between 0.1 and about 10 weight %, based on the weight of the resin.

10. The resin of claim 8 wherein the polyalkylene polyamine amine cure accelerant is selected from the group consisting of triethylene triamine, triethylene tetramine, tetraethylene tetramine, tetraethylene pentamine, and blends thereof, the polyalkylene glycol polyamine amine cure accelerant is selected from the group consisting of polyethyleneglycol diamines, and blends thereof, and is present in an amount between 0.1 and about 10 weight %, based on the weight of the resin.

11. The resin of claim 7 wherein said resin is cured in the presence of effective amounts of cyclic carbonate cure accelerant, amine cure accelerant, and resorcinol source.

* * * * *

UNITED STATES PATENT AND TRADEMARK OFFICE
CERTIFICATE OF CORRECTION

PATENT NO. : 7,049,387 B2 Page 1 of 1
APPLICATION NO. : 09/977245
DATED : May 23, 2006
INVENTOR(S) : Frederick C. Dupre, Jr.

It is certified that error appears in the above-identified patent and that said Letters Patent is hereby corrected as shown below:

Column 4, Line 13, please replace "I" with --1--.

Signed and Sealed this

Fourth Day of September, 2007

JON W. DUDAS
*Director of the United States Patent and Trademark Office*